US009224156B2

(12) United States Patent
Moorer

(10) Patent No.: US 9,224,156 B2
(45) Date of Patent: Dec. 29, 2015

(54) PERSONALIZING VIDEO CONTENT FOR INTERNET VIDEO STREAMING

(71) Applicant: James A. Moorer, Panacea, FL (US)

(72) Inventor: James A. Moorer, Panacea, FL (US)

(73) Assignee: ADOBE SYSTEMS INCORPORATED, San Jose, CA (US)

(*) Notice: Subject to any disclaimer, the term of this patent is extended or adjusted under 35 U.S.C. 154(b) by 209 days.

(21) Appl. No.: 13/622,647

(22) Filed: Sep. 19, 2012

(65) Prior Publication Data

US 2014/0082209 A1    Mar. 20, 2014

(51) Int. Cl.
G06F 15/16    (2006.01)
G06Q 30/02    (2012.01)
H04N 21/2668    (2011.01)
H04N 21/458    (2011.01)
H04N 21/81    (2011.01)

(52) U.S. Cl.
CPC ....... G06Q 30/0251 (2013.01); H04N 21/2668 (2013.01); H04N 21/458 (2013.01); H04N 21/812 (2013.01)

(58) Field of Classification Search
CPC ............ H04N 21/4788; H04N 21/812; H04N 21/258; H04N 21/4316; H04N 21/4532; H04N 21/472; H04N 21/47202; H04N 21/488; H04N 21/8126; H04N 21/23424
USPC ............ 709/201, 217, 219, 230, 231; 725/43, 725/46
See application file for complete search history.

(56) References Cited

U.S. PATENT DOCUMENTS

| 7,941,562 | B2 * | 5/2011 | Cheng et al. .................. 709/246 |
| 2002/0078456 | A1 * | 6/2002 | Hudson et al. ................. 725/60 |
| 2009/0193457 | A1 * | 7/2009 | Conn ............................... 725/34 |
| 2011/0145430 | A1 * | 6/2011 | Ha et al. ........................ 709/231 |
| 2011/0321087 | A1 * | 12/2011 | Huber et al. ..................... 725/34 |
| 2012/0019722 | A1 * | 1/2012 | Kwisthout et al. ............ 348/564 |
| 2012/0054278 | A1 * | 3/2012 | Taleb et al. .................... 709/204 |
| 2012/0072936 | A1 * | 3/2012 | Small et al. ..................... 725/10 |
| 2012/0131610 | A1 * | 5/2012 | Fernandez Gutierrez et al. .............................. 725/34 |

* cited by examiner

*Primary Examiner* — Brian J Gillis
*Assistant Examiner* — Kamran Mohammadi
(74) *Attorney, Agent, or Firm* — Shook, Hardy & Bacon L.L.P.

(57) ABSTRACT

A video preparation system is described. The system includes an event detector, a viewer identification, a selector, a video synthesis module, and a communications module. The event detector may be configured to detect an event associated with a main video content. The viewer identification module may be configured to determine an identification of a viewer associated with the event and to obtain information about the viewer. The selector may be configured to select additional video content that could be presented with the main video content. The video synthesis module may be configured to modify, in real time, the video content to produce a resulting content based on the information about the viewer. The communications module may be configured to provide the resulting content to a play-out server, the resulting content suitable for streaming via the Internet to a client computer system associated with the viewer.

13 Claims, 4 Drawing Sheets

PERSONALIZING VIDEO CONTENT FOR INTERNET VIDEO STREAMING

TECHNICAL FIELD

This application relates to the technical fields of software and/or hardware technology and, in one example embodiment, to system and method for preparation and delivery of custom personalized messages, such as advertisements, in streaming Internet video.

BACKGROUND

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

Today's advertising, television advertising in particular, tends to be "shotgun" presentations where many or all viewers in a given area receive the identical advertisement. Furthermore, the television presentation is often interrupted for the advertising presentation. User studies show that many people drop off (stop viewing) during the commercial breaks. Some cable channels use "fly-ins" or overlaid video material to reduce the intrusiveness of the advertising material, but these are still fixed, "canned" pieces of video that are broadcasted identically to large numbers of viewers.

BRIEF DESCRIPTION OF DRAWINGS

Embodiments are illustrated by way of example and not limitation in the figures of the accompanying drawings, in which like references indicate similar elements and in which.

DETAILED DESCRIPTION

Figure 1:
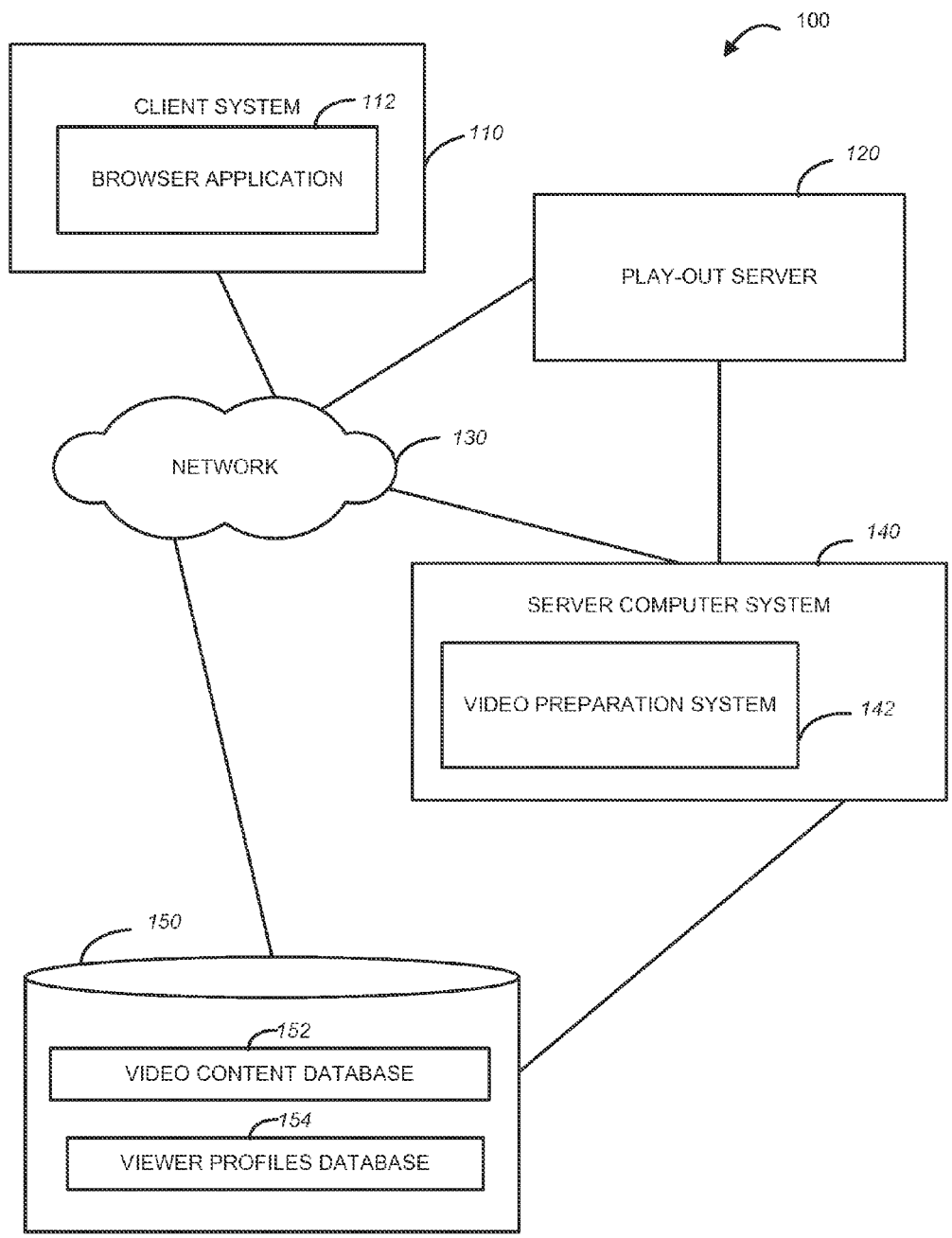
FIG. 1 is a block diagram showing a network environment within which a method and system for preparation and delivery of custom messages in streaming video may be implemented, in accordance with an example embodiment.

In the following detailed description, numerous specific details are set forth to provide a thorough understanding of claimed subject matter. However, it will be understood by those skilled in the art that claimed subject matter may be practiced without these specific details. In other instances, methods, apparatuses or systems that would be known by one of ordinary skill have not been described in detail so as not to obscure claimed subject matter.

Some portions of the detailed description which follow are presented in terms of algorithms or symbolic representations of operations on binary digital signals stored within a memory of a specific apparatus or special purpose computing device or platform. In the context of this particular specification, the term specific apparatus or the like includes a general purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and generally, considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these or similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

In one example embodiment, an inventive solution provides not just an overlay of stock material selected from a range of "canned" video elements, but permits real-time image synthesis, where real-time animated elements may be combined with pre-packaged elements to produce a fully customized video stream that can then be delivered to a specific client. One example advantage of this approach is that the advertising or informational content can be exactly targeted to the individual viewer. A unique synthesized video may be created such that nobody but the targeted individual would receive the synthesized video stream that was created for that individual. For example, the synthesized video stream that was created for a particular viewer may include the name or even a picture of the viewer, as well as other information that could be obtained, e.g., based on the viewer's social network profile, possibly gathered in real time. It will be noted that the word "viewer" will be understood as a current or potential viewer or an author of video content.

A method for the preparation delivery of custom personalized messages in streaming video may be implemented within a web server architecture that inserts advertising materials into a video stream. The basic elements of such architecture may include:

(1) a source of video content that may be either stored or live, (2) an advertisement server that may be configured to access information about the video content and information about the viewer and select any of a number of prepared advertisements, (3) a synthesizing component that includes a means of either overlaying the advertisement over the video presentation or switching to the selected advertising video, and (4) a "play-out" server configured to encode and send the resulting synthesized video stream with advertising over the public Internet.

An advertisement server may be modified to produce not only prepared video content (such as advertisements that can be appended to or overlayed over the video stream that is being presented to a viewer), but also animation and video-processing scripts that can include instructions of how the information about the viewer is to be used in modifying the additional video content or how to assemble the modified advertisement content based on the features or attributes of video content itself, the information about the viewer, or both.

For example, a viewer' profile may include an indication that the viewer is interested in ecology and conservation. Based on this information, an advertisement for an energy-efficient automobile may be selected. A photograph of the viewer may then be composited into the selected advertisement to make it look like the viewer is driving the automobile. In another example, a viewer' profile may include an indication that the viewer is athletic. Animation in the selected advertisement may be synthesized to show the viewer in modern sportsware from particular vendor. In yet another example, a viewer' profile may include an indication that the viewer owns a lot of electronics. Video of the selected advertisement may then be synthesized in a way that shows an image of the viewer using the latest model of a cell phone. To reduce costs to advertisers, sometimes combinations of these attributes can be made. For instance, to combine the previous two items, the viewer can be shown in modern sportsware talking on the latest cell phone. In a further example, a viewer' profile may include an indication that the viewer and friends enjoy gaming. Animation may be synthesized showing the viewer and friends trying out the latest game controller.

Note that the viewer profile can also include information from the profiles of the viewer's circle of friends, as extracted, e.g., from social web sites. This extracted information may be stored in the viewer database together with other information from the user's profile.

Thus, an example method for preparation and delivery of custom personalized messages, such as advertisements, in streaming Internet video may include selecting additional video content (e.g., an advertisement) while the streaming video is being presented to a viewer, modifying the additional video content based on the information about the viewer, and associating the modified content with the streaming video. The associating of the modified content with the streaming video may be in the form of appending the modified content to the streaming video or, e.g., overlaying the modified content over the streaming video. The streaming video that is being presented to a viewer, for the purposes of this description, may be termed the main content. The additional video content that can be associated with the main content may include advertisement or any other content that is distinct from the main content. The additional video content that is to be modified using the techniques described herein may be termed source content or a source video. The resulting modified video stream—including the main content and the modified content—may be based on the features of the main content, the information about the source video and also include synthetic elements prepared based on the information about the viewer. The resulting custom video stream can then be sent to the play-out server to be forwarded to the client.

Example method and system for preparation and delivery of custom messages in streaming video may be described with reference to a network environment illustrated in FIG. 1. The network environment 100 may include one or more computer systems, such as a client computer system 110 and a server computer system 140. The server computer system 140 and the client computer systems 110 and 120 may be in communication with each other via a communications network 130. The communications network 130 may be a public network (e.g., the Internet, a wireless network, a public switched telephone network (PSTN), etc.) or a private network (e.g., LAN, WAN, Intranet, etc.). A computer system includes, but is not limited to, a personal computer to a "smart" phone to an iPad, to a game console, etc.

As shown in FIG. 1, the server computer system 140 hosts a system for preparation and delivery of custom messages in streaming video—a video preparation system 142. The video preparation system 142 may be configured to have access to a data about source videos and data about viewers. The data about the source videos and data about viewers may be stored in a repository 150 that stores a video content database 152 and a viewer profiles database 154. The video content database 152 and the viewer profiles database 154 can be implemented in a number of ways—they don't have to be one single system. They could be separate computers, or they could be distributed over a multitude of computers.

The video preparation system 142 may be configured to have access to the video content (main video content) that is being presented to a viewer. The main video content may be either previously stored or streaming live. The server computer system 140, which, in one example embodiment, is an advertisement server, can access a video content database 152 and a user profiles database 154 and, based on the accessed information, select one or more previously stored advertisements. A synthesizing component, that may be termed a video synthesis module, may be provided as part of the video preparation system 142. A video synthesis module may be configured to synthesize an advertisement video from basic elements, some of which may be pre-recorded, some of which may be extracted from the viewer's profile (e.g., pictures of the viewer and friends), some of which may be stock footage. These basic elements may be combined using video production tools—e.g., video compositing, texture mapping, image morphing, and any of a number of digital techniques for manipulating video images. A video synthesis module may also be configured to perform the overlay of the advertising video based on the main video itself. For instance, a synthesized video of the viewer may be inserted in a particular car that appears in a street scene in the main video that is being presented to the viewer. The synthesized video can be combined with the presentation (e.g., with the main content that may be a streaming video being presented to the viewer) in very complex ways by using modern special effects techniques. In some instances, information related to the presentation in the main video (e.g., the location of the street shown in the main video) may be retrieved from a database derived during the presentation itself by direct video analysis of the images being presented.

A prepared video that was modified by the video preparation system 142 can be delivered to the client system 110 via a play-out server 120. A prepared video (also termed the resulting synthesized video stream) is a combination of the main content and the modified content. The play-out server 120 may be configured to receive the resulting synthesized video stream from the server system 140 and encode and send it over the public Internet to the client system 110. The client system 110 may host a browser application 112 that can be used for viewing video streams received from the play-out server 120.

While FIG. 1 illustrates a conventional architecture, the server 140 that hosts the video preparation system 142 may be executing in a cloud. The phrase "cloud computing" refers to an architectural paradigm in which computation is moved from local servers to a remote service that provides computation as a commodity or utility. A "cloud" is typically a large collection of shared commodity computation resources that can be interchangeably provisioned for client computation requests. Cloud computing is frequently used in software-as-a service (SaaS) application architectures and may be viewed as an implementation choice for application deployment that leverages shared resources and improved cost structure of the cloud. A cloud computing approach may be used to implement a variety of computational paradigms, such as virtual machines, jobs, remote procedure calls, traditional servers, etc. An example video preparation system may be discussed with reference to FIG. 2.

Figure 2:
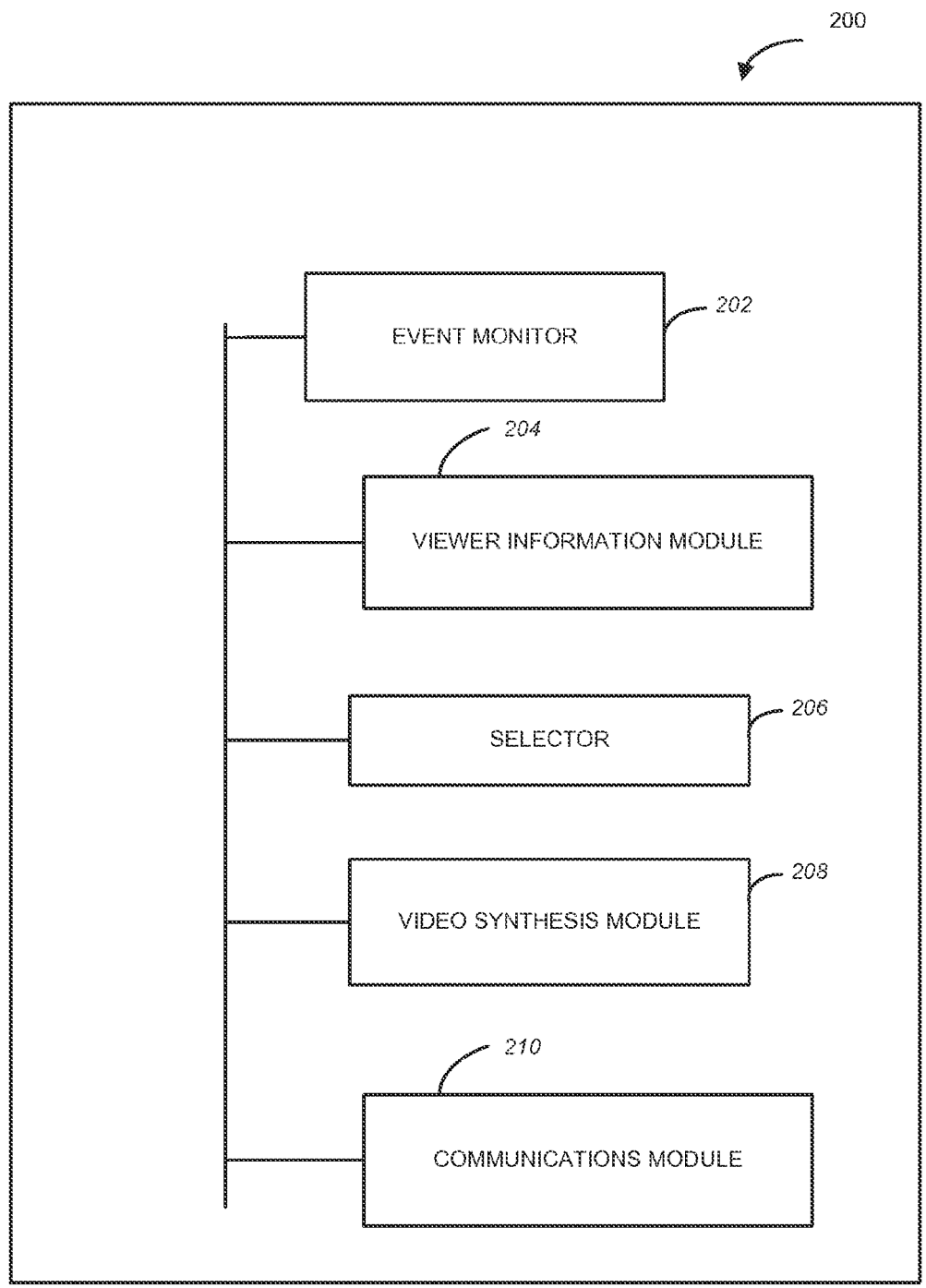
FIG. 2 is a block diagram illustrating a system for preparation and delivery of custom messages in streaming video, in accordance with an example embodiment.

FIG. 2 shows a block diagram illustrating a video preparation system 200. As shown in FIG. 2, the system 200 includes an event detector 202, a viewer identification 204, a selector 206, a video synthesis module 208, and a communications module 210. The event detector 202 may be configured to detect an event associated with a video content that is being presented or is to be presented to a viewer (the main video content, also referred to merely as the main content). The viewer identification module 204 may be configured to determine an identification of a viewer associated with the event and to obtaining information about the viewer. The selector 206 may be configured to select additional video content, e.g., an advertisement that could be presented with the main video content. The video synthesis module 208 may be configured to modify the additional video content to produce resulting content based on the information about the viewer, and associate the modified content with the main content. The modifying of the additional video content may be performed in real time. The communications module 210 may be configured to provide the content resulting from associating the modified content with the main content to a playout server. The resulting content may be suitable for streaming via the Internet to a client computer system associated with the viewer. Various operations performed by the system 200, according to an example embodiment, may be discussed with reference to FIG. 3.

Figure 3:
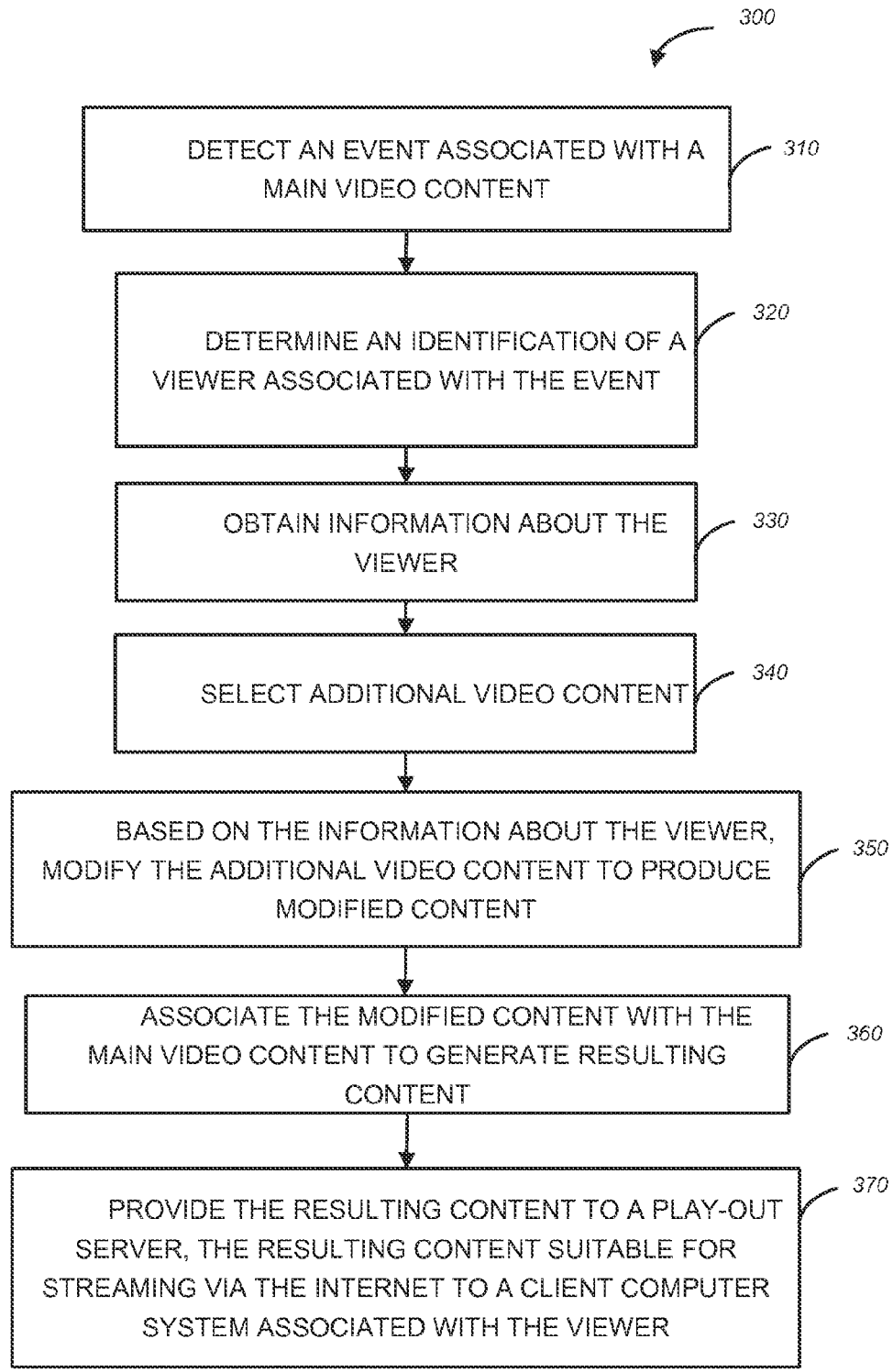
FIG. 3 is a flow chart illustrating a method for preparation and delivery of custom messages in streaming video, in accordance with an example embodiment.

FIG. 3 is a flow chart illustrating a method 300 for delivery of custom messages in streaming video. The method 300 uses the viewer's profile in server-side video synthesis where the video synthesis is directed based on the information obtained from the viewer's profile. The method 300 may be performed by processing logic that may comprise hardware (e.g., dedicated logic, programmable logic, microcode, etc.), software (such as run on a general purpose computer system programmed to perform particular functions pursuant to instructions from program software or on a dedicated machine), or a combination of both. The processing logic, according to example embodiments, may reside in any of the modules shown in FIG. 2. The modules illustrated in FIG. 2 may be implemented as software, hardware, or a combination of both.

As shown in FIG. 3, the method 300 for delivery of custom messages in streaming video commences with operation 310, where the event monitor 202 of FIG. 2 detects an event associated with a particular video content (main video content) that is to be modified by adding further content such as an advertisement. The main video content may be, e.g., previously stored content or a live video stream. The operations 320 through 370 are performed in real time, responsive to the event detected by the event detector 202.

The event associated with a main video content may be, e.g., receiving a request from the viewer for specific video content. In some embodiments, the event may be detecting the main video content, e.g., the main video content is provided by the viewer. For example, a viewer may submit a video via a social network system, which video may then be and have it distributed to another viewer (or several viewers) in a personalized form. For example, the viewer (who may also be referred to as a user or an author or an originator of the video) may be allowed to submit the original assets (stills and videos right out of the camera) and instructions, rather than a finished frozen video. The original assets may then be assembled into a finished video, using the instructions. In one embodiment, the instructions are in the form of an "edit decision list," or EDL. The assets may have some information associated with them, or this information may be derived by picture analysis. The kind of information might be what people appear in the images, where the images were taken, and so on. Depending on the prospective viewer of the newly-submitted video, the instructions for assembling the video may be altered, so that it contains more of the assets of interest to that viewer. The author might have provided instructions for this customization, or the server might make alterations to the presentation in an entirely automated fashion.

Examples of the kinds of modifications are listed below.
1. When the video is viewed by the grandparents of the author, additional images of the grandchildren might be included.
2. When a friend of the author is viewing the video, additional images known to be of interest to that friend (derived from the friend's viewer profile) can be selected. For instance, people in whom the friend is known to be interested could be included (e.g., family members, schoolmates, etc.).
3. Depending on who is watching the video, some naughty words on the sound track might be bleeped (made unintelligible). For instance, if the 5-year-old cousins of the author are viewing the video, some alterations might be made to make the video age-appropriate (eliminate bad language or nudity or inappropriate references).

Returning to FIG. 3, the event detected by the event detector 202 may be a certain time in the presentation. For example, advertisement content may be inserted as the main video reaches the tenth minute.

At operation 320, the viewer information module 204 of FIG. 2 determines an identification of a viewer associated with the event. At operation 330, the viewer information module 204 accesses or retrieves information about the viewer from the viewer profile database 154, based on the identification of the viewer. At operation 340, the selector 206 of FIG. 2 selects additional video content, e.g., an advertisement that is to be presented in conjunction with the main video content. Based on the obtained information about the viewer, the video synthesis module 208 of FIG. 2 modifies the additional video content to produce modified content at operation 350.

In one embodiment, the video synthesis module 208 may be provided with a template that provides instructions of how the information about the viewer (the information retrieved from the viewer's profile and, possibly, information related to the viewer's actions) is to be used in modifying the additional video content. The template may be in the form of a script. Shown below in Table 1 is an example of a script, in pseudo-code, for displaying three images.

TABLE 1

| |
| --- |
| show "IMG1.jpg" start at 0 seconds for 3 seconds |
| Fade in 0.2 seconds |
| Fade out 0.2 seconds |

TABLE 1-continued

```
show    "IMG2.jpg" start at 2.8 seconds for 3 seconds
        Fade in 0.2 seconds
        Fade out 0.2 seconds
        Zoom to (240, 100, 105, 131) over 2 seconds
show    "IMG3.jpg" start at 5.6 seconds for 3 seconds
        Fade in 0.2 seconds
        Fade out 0.2 seconds
```

The pseudo-code in Table 1 illustrates the instructions resulting in the overlapping of the images, where one image will fade in while the other is fading out. The middle image will also have a zoom and pan applied to slowly zoom in to the coordinates of a particular face in the image. Let us say that the images are all 720 pixels wide and 480 pixels tall (this is a standard video format). Let us say the file names of the images are "IMG1.jpg", "IMG2.jpg", and "IMG3.jpg." Let us say that there is an interesting face in the second image that is located at a rectangle located 240 points to the right and 100 points down from the top (images generally have (0, 0) at the top-left), and is 105 pixels wide and 131 pixels high. This is just an example of how a slide show can be built up out of simple commands. It will be understood that the computer might insert a new image—it would just add a few lines of text and fix up the image start times. For instance, the computer might find an image (call it "IMG4.jpg") that has the face of a friend of the viewer at a certain position in the image. Table 2 below is an example of a script, in pseudo-code, for inserting a new image into the EDL.

TABLE 2

```
show    "IMG1.jpg" start at 0 seconds for 3 seconds
        Fade in 0.2 seconds
        Fade out 0.2 seconds
show    "IMG2.jpg" start at 2.8 seconds for 3 seconds
        Fade in 0.2 seconds
        Fade out 0.2 seconds
        Zoom to (240, 100, 105, 131) over 2 seconds
show    "IMG4.jpg" start at 5.6 seconds for 3 seconds
        Fade in 0.2 seconds
        Fade out 0.2 seconds
        Zoom to (424, 210, 125, 171) over 2 seconds
show    "IMG3.jpg" start at 8.4 seconds for 3 seconds
        Fade in 0.2 seconds
        Fade out 0.2 seconds
```

Thus, the process of modifying video content may include selecting additional video content (e.g., an advertisement), modifying the additional video content based on the information about the viewer, and associating the modified content with the main content. The additional video content may be appended to the main content or overlayed over the main content. For example, if the additional video content is a rolling trailer of a superhero movie, this additional video content may be modified by placing an image on the viewer's face in place of the superhero's face. Returning to FIG. 3, at operation 360, the video synthesis module 208 associates the modified content with the main video content to produce a resulting content. As explained above, the associating may include overlaying or appending the modified content (e.g., a modified advertisement video) to the main video content. The communications module 210 of FIG. 2 provides the resulting content to the play-out server 120 of FIG. 1 at operation 370.

Figure 4:
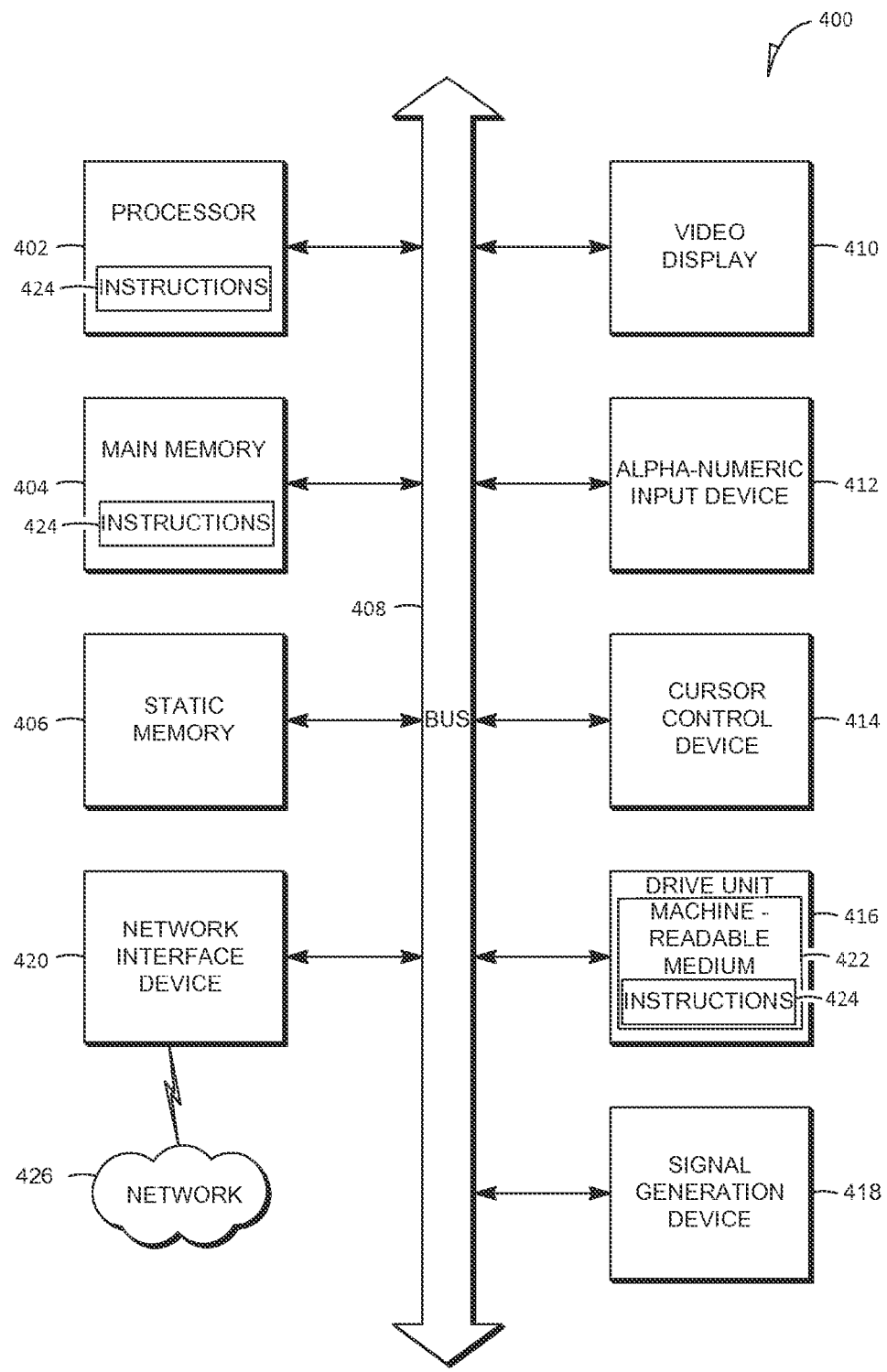
FIG. 4 is a diagrammatic representation of a machine in the example form of a computer system within which a set of instructions, for causing the machine to perform any one or more of the methodologies discussed herein, may be executed.

FIG. 4 is a diagrammatic representation of a machine in the example electronic form of a computer system 400 within which a set of instructions, for causing the machine to perform any one or more of the methodologies discussed herein, may be executed. In various embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a portable music player (e.g., a portable hard drive audio device such as an "Moving Picture Experts Group (MPEG) Layer 3" (MP3) player), a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 400 includes a processor 402 (e.g., a central processing unit (CPU), a graphics processing unit (GPU) or both), a main memory 404, and a static memory 406, which communicate with each other via a bus 408. The computer system 400 may further include a video display unit 410 (e.g., a liquid crystal display (LCD) or a cathode ray tube (CRT)). The computer system 400 also includes an alphanumeric input device 412 (e.g., a keyboard), a user interface (UI) cursor control device 414 (e.g., a mouse), a disk drive unit 416, a signal generation device 418 (e.g., a speaker) and a network interface device 420.

The disk drive unit 416 includes a computer-readable (or machine-readable) medium 422 on which is stored one or more sets of instructions and data structures (e.g., software 424) embodying or utilized by any one or more of the methodologies or functions described herein. The software 424 may also reside, completely or at least partially, within the main memory 404 and/or within the processor 402 during execution thereof by the computer system 400, the main memory 404 and the processor 402 also constituting machine-readable media.

The software 424 may further be transmitted or received over a network 426 via the network interface device 420 utilizing any one of a number of well-known transfer protocols (e.g., Hyper Text Transfer Protocol (HTTP)).

The software 524 may further be transmitted or received over a network 526 via the network interface device 520 utilizing any one of a number of well-known transfer protocols (e.g., Hyper Text Transfer Protocol (HTTP)).

While the machine-readable medium 422 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing or encoding a set of instructions for execution by the machine and that cause the machine to perform any one or more of the methodologies of the present invention, or that is capable of storing or encoding data structures utilized by or associated with such a set of instructions. The term "machine-readable medium" shall accordingly be taken to include, but not be limited to, solid-state memories, optical and magnetic media. Such medium may also include, without limitation, hard disks, floppy disks, flash memory cards, digital video disks, random access memory (RAMs), read only memory (ROMs), and the like.

The embodiments described herein may be implemented in an operating environment comprising software installed on a computer, in hardware, or in a combination of software and hardware. Although embodiments have been described with reference to specific example embodiments, it will be evident that various modifications and changes may be made to these embodiments without departing from the broader spirit and scope of the invention. Accordingly, the specification and drawings are to be regarded in an illustrative rather than a restrictive sense.

What is claimed is:

1. A method comprising:
receiving a user-provided main video content;
determining an identification of a viewer and obtaining information about the viewer;
selecting additional video content based on the main video content;
accessing a template that provides instructions regarding how the information about the viewer is to be used in modifying the additional video content, wherein the instructions comprise an edit decision list, and wherein the instructions are different for different viewers;
based on the information about the viewer and on the instructions for modifying the additional video content, modifying, in real time, the additional video content to produce a modified video content;
associating the modified video content with the main video content to generate resulting content, wherein associating the modified video content with the main video content comprises at least one of overlaying the modified video content onto the main video content or appending the modified video content to the main video content; and
providing the resulting content to a play-out server, the resulting content suitable for streaming via a communications network to a client computer system associated with the viewer.

2. The method of claim 1, further comprising accessing information about the main video content and using the information about the main video content in the modifying of the additional video content.

3. The method of claim 1, wherein the modifying of the additional video content to produce the resulting content is performed by a server computing system, the server computing system executing in a cloud.

4. The method of claim 1, wherein the main video content is a previously-stored content or a live video stream.

5. The method of claim 1, wherein the communications network is the Internet.

6. A computer-implemented system comprising:
at least one processor;
computer storage media storing computer-executable instructions that, when executed by the at least one processor, implement a method comprising:
detecting an event associated with a main video content;
determining an identification of a viewer associated with the event and obtaining information about the viewer;
selecting additional video content based on a scene of the main video content;
accessing a template that provides instructions regarding how the information about the viewer is to be used in modifying the additional video content, wherein the instructions are different for different viewers, and wherein the instructions are configured to provide additional assets that are of interest to the viewer;
modifying, in real time, the additional video content to produce a modified video content based on the information about the viewer and on the instructions for modifying the additional video content, and
associating the modified video content with the main video content, such that the modified video content is included within the scene of the main video content, to generate resulting content; and
providing the resulting content to a play-out server, the resulting content suitable for streaming via a communications network to a client computer system associated with the viewer.

7. The system of claim 6, wherein the event associated with the main video content is receiving a request from the viewer for the main video content.

8. The system of claim 6, wherein the event associated with the main video content is detecting the main video content, the main video content provided by a user.

9. The system of claim 6, wherein the associating of the modified video content with the main video content comprises at least one of appending the modified video content to the main video content or overlaying the modified video content onto the main video content.

10. The system of claim 6, wherein the method further comprises accessing information about the main video content and using the information about the main video content in the modifying of the additional video content.

11. The system of claim 6, wherein the generating of the resulting content is performed by a server computing system, the server computing system executing in a cloud.

12. The system of claim 6, wherein the main video content is a previously-stored content or a live video stream.

13. A machine-readable non-transitory storage medium having instruction data to cause a machine to:
detect an event associated with a main video content;
determine an identification of a viewer associated with the event and obtain information about the viewer;
select additional video content based on a scene of the main video content;
access a template that provides instructions regarding how the information about the viewer is to be used in modifying the additional video content, wherein the instructions comprise an edit decision list, and wherein the instructions are different for different viewers;
based on the information about the viewer and on the instructions for modifying the additional video content, modify, in real time, the additional video content to produce a modified video content;
overlay the modified video content onto the scene of the main video content, such that the modified video content is included within the scene of the main video content, to generate resulting content; and
provide the resulting content to a play-out server, the resulting content suitable for streaming via a communications network to a client computer system associated with the viewer.

* * * * *

UNITED STATES PATENT AND TRADEMARK OFFICE
CERTIFICATE OF CORRECTION

PATENT NO.          : 9,224,156 B2
APPLICATION NO.     : 13/622647
DATED               : December 29, 2015
INVENTOR(S)         : James A. Moorer Page 1 of 1

It is certified that error appears in the above-identified patent and that said Letters Patent is hereby corrected as shown below:

In the claims:

Claim 6, column 9, line 49, insert -- and -- after "processor;".

Claim 6, column 10, line 7, delete "and".

Claim 6, column 10, line 7, replace the (,) after "content" with a (;).

Signed and Sealed this
Thirty-first Day of May, 2016

Michelle K. Lee
*Director of the United States Patent and Trademark Office*